US012585576B2

(12) United States Patent
Kirinuki et al.

(10) Patent No.: US 12,585,576 B2
(45) Date of Patent: Mar. 24, 2026

(54) TEST SUPPORT APPARATUS AND METHOD FOR TESTING WEB APPLICATIONS

(71) Applicant: NTT, Inc., Tokyo (JP)

(72) Inventors: Hiroyuki Kirinuki, Tokyo (JP); Haruto Tanno, Tokyo (JP); Yu Adachi, Tokyo (JP)

(73) Assignee: NTT, Inc., Tokyo (JP)

( * ) Notice: Subject to any disclaimer, the term of this patent is extended or adjusted under 35 U.S.C. 154(b) by 234 days.

(21) Appl. No.: 18/555,629

(22) PCT Filed: Apr. 30, 2021

(86) PCT No.: PCT/JP2021/017247
§ 371 (c)(1),
(2) Date: Oct. 16, 2023

(87) PCT Pub. No.: WO2022/230189
PCT Pub. Date: Nov. 3, 2022

(65) Prior Publication Data

US 2024/0202109 A1 Jun. 20, 2024

(51) Int. Cl.
*G06F 11/3668* (2025.01)

(52) U.S. Cl.
CPC ................................. *G06F 11/3688* (2013.01)

(58) Field of Classification Search
CPC .................................................... G06F 11/3688
USPC ................................................. 717/124–140
See application file for complete search history.

(56) References Cited

U.S. PATENT DOCUMENTS

| | | | | |
|---|---|---|---|---|
| 6,012,152 | A * | 1/2000 | Douik ................. | G06F 11/0709 714/E11.027 |
| 6,493,834 | B1 * | 12/2002 | Bates ................. | G06F 11/3698 714/E11.21 |
| 8,745,600 | B2 * | 6/2014 | Lanzkron ........... | G06F 11/3466 717/135 |
| 9,104,810 | B2 * | 8/2015 | Zhang ................. | G06F 11/3684 |
| 9,514,031 | B2 * | 12/2016 | Jordan ................ | G06F 11/3698 |
| 10,108,535 | B2 * | 10/2018 | Aggarwal ........... | G06F 11/3672 |
| 10,296,437 | B2 * | 5/2019 | Ismael ................ | G06F 11/3612 |
| 10,853,481 | B1 * | 12/2020 | Magnuson ............ | G06F 21/121 |
| 11,552,986 | B1 * | 1/2023 | Templeman ........ | H04L 63/1425 |
| 11,662,998 | B2 * | 5/2023 | Neves .................. | G06F 40/284 717/132 |

(Continued)

OTHER PUBLICATIONS

Sahin et al, "Towards Understanding and Improving Security-RelevantWeb Application Logging", ACM, pp. 1-16 (Year: 2024).*

(Continued)

*Primary Examiner* — Anil Khatri
(74) *Attorney, Agent, or Firm* — IPUSA, PLLC

(57) ABSTRACT

A test support apparatus according to an embodiment is a test support apparatus that supports a test with respect to a Web application, the test support apparatus including: a suspicion level calculating unit which calculates, using information related to an operation performed on a screen of the Web application and information related to a bug of the Web application, a suspicion level representing a suspiciousness that the bug is caused by the operation on the screen; and a proposing unit which proposes, based on the suspicion level, a location to be tested on the screen of the Web application.

4 Claims, 6 Drawing Sheets

(56)          References Cited

U.S. PATENT DOCUMENTS 12,289,326 B2 *   4/2025   Bouchard   ............. H04L 63/145

OTHER PUBLICATIONS

Troya et al, "Model Transformation Testing and Debugging: A Survey", ACM, pp. 1-39 (Year: 2022).*
Artzi et al, "Finding Bugs in Dynamic Web Applications", ACM, pp. 1-11 (Year: 2008).*
Zheng et al, "Statically Locating Web Application Bugs Caused by Asynchronous Calls", ACM, pp. 1-10 (Year: 2011).*
Hong et al, "Detecting Concurrency Errors in Client-side JavaScript Web Applications", IEEE, pp. 1-10 (Year: 2014).*
NTT Data Corporation, "Leverage "exploratory testing" to improve quality", Data Insight, Jul. 24, 2014, https://www.nttdata.com/jp/ja/data-insight/2014/072401/.

* cited by examiner

TEST SUPPORT APPARATUS AND METHOD FOR TESTING WEB APPLICATIONS

TECHNICAL FIELD

The present invention relates to a test support apparatus, a test support method, and a program.

BACKGROUND ART

Exploratory testing is a method in which contents of a test to be performed next is considered while a test is being performed. In exploratory testing, by determining test contents on the fly with a focus on a latest test result or a behavior of software during testing, a location which may potentially hide a system failure is tested in an intensive manner. Therefore, preliminary preparations such as creating a test design document can be reduced and a failure of the system can be efficiently discovered.

While exploratory testing requires a test executor (hereinafter, also referred to as a tester) to have certain skills, a major benefit of exploratory testing is that a system failure can be discovered without relying on a design document or a specification sheet even when software is developed with unconfirmed specifications.

CITATION LIST

Non Patent Literature

NPL 1: "Enhancing Quality by Utilizing "Exploratory Testing"", NTT DATA Corporation, DATA INSIGHT, Jul. 24, 2014, Technical Blog "INSIGHT TECH"

SUMMARY OF INVENTION

Technical Problem

However, with exploratory testing, since contents of a test are determined by the tester, there is a problem in that the ability to detect bugs is dependent on how much the tester knows about the test, the tester's level of understanding towards the system, and the like. In other words, exploratory testing is highly individual-dependent and, generally, there is risk that bugs cannot be detected efficiently unless the tester is skilled.

Existing exploratory testing support tools support documentation of test cases and formulation of test plans, and since a user is required to manually perform such documentation and formulation, using such tools does not result in improving the bug detection capability of the tester.

An embodiment of the present invention was made in view of the point made above and an object thereof is to support efficient bug detection.

Solution to Problem

In order to achieve the object described above, a test support apparatus according to an embodiment is a test support apparatus that supports a test with respect to a Web application, the test support apparatus including: a suspicion level calculating unit which calculates, using information related to an operation performed on a screen of the Web application and information related to a bug of the Web application, a suspicion level representing a suspiciousness that the bug is caused by the operation on the screen; and a proposing unit which proposes, based on the suspicion level, a location to be tested on the screen of the Web application.

Advantageous Effects of Invention

Efficient bug detection can be supported.

DESCRIPTION OF EMBODIMENTS

Figure 1:
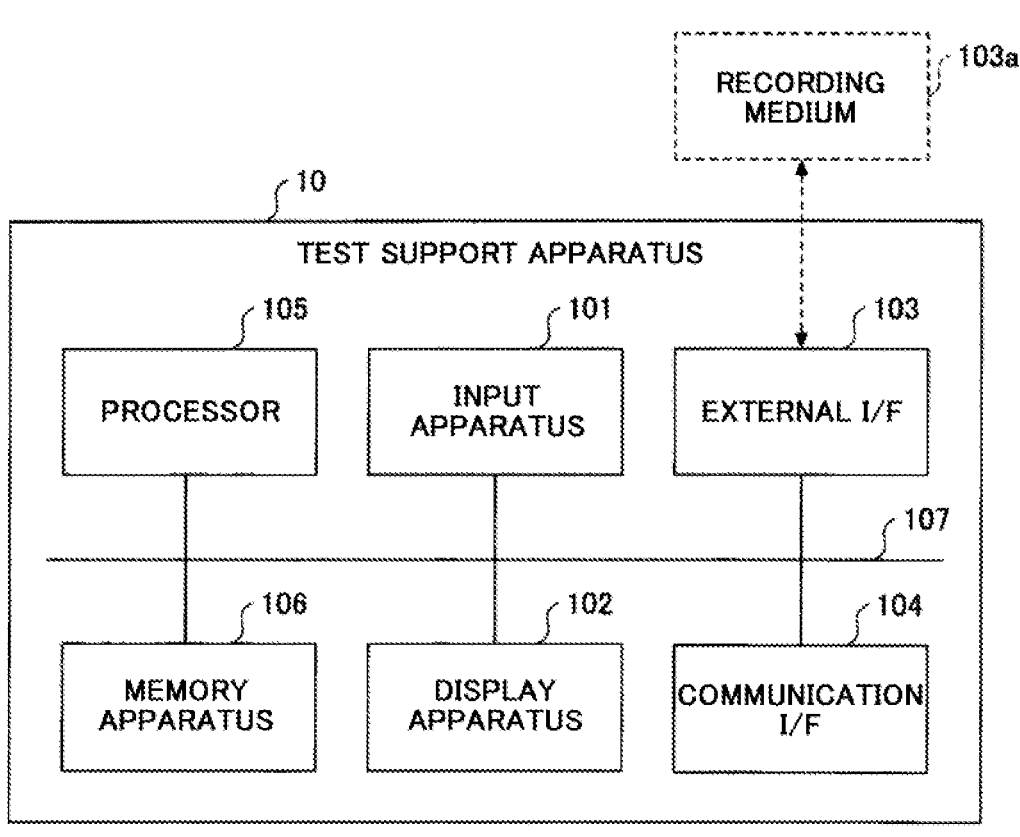
FIG. 1 is a diagram showing an example of a hardware configuration of a test support apparatus according to a present embodiment.

Hereinafter, an embodiment of the present invention will be described. In the present embodiment, a test support apparatus 10 capable of supporting efficient bug detection when testing a Web application particularly for exploratory testing will be described.

<Test Support Method>

First, a test support method proposed in the present embodiment will be described. The test support apparatus 10 according to the present embodiment is capable of realizing support for efficient bug detection by executing the test support method as processing (test support processing to be described later).

As described above, in the test support method proposed in the present embodiment, a Web application displayed on a Web browser mounted on a PC (personal computer), a mobile terminal, or the like is a test object. When a tester performs a test on each screen of the Web application, information such as the following is recorded.

(1) Information indicating a Web element (for example, a button, a select box, an input field, or the like) operated by the tester (2) Information indicating contents of the operation by the tester (an item value selected by a depression of a button or a link by a click or the like, a value input by a text input, or the like) and a time stamp (in other words, a date and time of the operation)

(3) Information indicating a screen on which an operation has been performed by the tester (4) Information related to bugs detected during the test The screen of the Web application is described in a markup language such as HTML (Hypertext Markup Language). In addition, the Web element is described by, for example, an HTML element (or an HTML tag).

Hereinafter, information including (1) to (3) above will also be referred to as "operation information" and (4) above will also be referred to as "bug information". The operation information also includes information (for example, a user ID or a tester ID) indicating the tester having performed the operation. Similarly, the bug information includes information (for example, a user ID or a tester ID) indicating the tester having detected and reported the bug. The bug information also includes information indicating a timing at which the bug has been detected (for example, pieces of information (such as operation information IDs) respectively indicating operation information related to an operation performed immediately before the detection of the bug and operation information related to an operation performed immediately after the detection of the bug).

The operation information and the bug information can be recorded by any known method. For example, the operation information can be automatically recorded by monitoring operations with respect to the Web browser. In addition, for example, the bug information can be recorded by using a technique described in WO 2020/230241.

For example, when a test is performed by a plurality of testers, operation information and bug information for all the testers are recorded.

In the test support method according to the present embodiment, after calculating predetermined index values with respect to a Web element and a screen using the operation information and the bug information described above, a value called a suspicion level defined by these index values is calculated. The suspicion level is a value introduced in the test support method according to the present embodiment and represents a suspiciousness that a bug is caused by an operation with respect to the Web element or the screen.

In addition, in the test support method according to the present embodiment, a location having a high suspicion level (in other words, a Web element or a screen which has a high suspicion level and in which a bug is easily detected) is highlighted and displayed. In this way, since a location to be operated next (in other words, a location where a bug is easily detected) is proposed to the tester, efficient bug detection is supported.

<<Index Value>>

Let a set of users (testers) be denoted by U, a set of Web elements be denoted by W, and a set of screens be denoted by P. Note that U, W and P are variables of which values can be designated by a user.

Index values $f_{w1}$ to $f_{w5}$ with respect to Web elements and index values $f_{p1}$ to $f_{p8}$ with respect to screens are defined using the operation information and the bug information.

Index Values with Respect to Web Elements $f_{w1}$ (U, W)=the number of times U has performed an operation with respect to W $f_{w2}$ (U, W)=the number of times U has performed an input with respect to W $f_{w3}$ (U, W)=the number of times U has performed a unique input with respect to W $f_{w4}$ (U, W)=a time (seconds) after an operation is performed by U with respect to W until a next operation is performed $f_{w5}$ (U, W)=the number of bugs associated with W detected by U Index Values with Respect to Screens $f_{p1}$ (U, P)=the number of times U has made a transition to P $f_{p2}$ (U, P)=the number of times U has performed an in-screen operation with respect to P $f_{p3}$ (U, P)=the number of input value sets given to P by U $f_{p4}$ (U, P)=the number of unique input value sets given to P by U $f_{p5}$ (U, P)=dwell time at P by U (seconds)

$f_{p6}$ (U, P)=the number of bugs associated with P detected by U $f_{p7}$ (P)=the number of Web elements of P $f_{p8}$ (P)=the number of times a transition has been made to P In this case, a bug associated with a Web element refers to a bug detected immediately after an operation with respect to the Web element. On the other hand, a bug associated with a screen refers to a bug detected on the screen.

Furthermore, when a Web element is a button, a link, a check box, a select box, or the like, an input with respect to the Web element refers to a depression or a selection thereof, and when a Web element is an input form or the like, an input with respect to the Web element refers to an input of a text or the like. In addition, a unique input with respect to the Web element refers to an input obtained by excluding duplicates from the inputs with respect to the Web element.

On the other hand, an input value set given to a screen refers to, for example, a set of input values (for example, item values selected by the user, text input by the user, and the like) given to all Web elements in the screen after a transition is made to the screen until a transition is made to another screen. In addition, the number of input value sets given to the screen refers to a set of input values obtained by excluding duplicates from the input value sets given to the screen.

The index values $f_{w1}$ and $f_{p2}$ also include the number of times an operation (bug reporting operation) has been performed in order to report a bug. When a plurality of bugs are detected and reported with respect to one operation or one screen transition, it is assumed that the bug reporting operation is performed the same number of times as the number of bugs. For example, when n-number of bugs are detected and reported with respect to one operation or one screen transition, it is assumed that n-number of bug reporting operations have been performed. This is done in order to prevent an inappropriate value from being taken when calculating the suspicion level to be described later.

The values of the index values $f_{w1}$ to $f_{w5}$ and $f_{p1}$ to $f_{p8}$ described above are calculated by substituting specific values for the variables U, W, and P. For example, when U={$u_1$, $u_2$} and W={$w_1$, $w_2$}, $f_{w1}$ ({$u_1$, $u_2$}, {$w_1$, $w_2$}) is a sum of the number of times that a user $u_1$ has performed an operation with respect to the Web element $w_1$, the number of times that the user $u_1$ has performed an operation with respect to the Web element $w_2$, the number of times that a user $u_2$ has performed an operation with respect to the Web element $w_1$, and the number of times that the user $u_2$ has performed an operation with respect to the Web element $w_2$. Similarly, when U={$u_1$, $u_2$} and P={$p_1$, $p_2$}, $f_{p1}$ ({$u_1$, $u_2$}, {$p_1$, $p_2$}) is a sum of the number of times that the user $u_1$ has made a transition to the screen $p_1$, the number of times that the user $u_1$ has made a transition to the screen $p_2$, the number of times that the user $u_2$ has made a transition to the screen $p_1$, and the number of times that the user $u_2$ has made a transition to the screen $p_2$.

In this case, with u∈U and w∈W, the number of times the user u has performed an operation with respect to the Web element w can be calculated as the number of pieces of operation information with respect to the Web element w among the pieces of operation information of the user u. In a similar manner, with u∈U and p∈P, the number of times that the user u has made a transition to the screen p can be calculated as the number of pieces of operation information with respect to a Web element (a link or the like) for making a transition to the screen p among the pieces of operation information of the user u.

The other index values $f_{w2}$ to $f_{w5}$ and $f_{p2}$ to $f_{p8}$ can be similarly calculated from the operation information and the bug information. In the following description, it is assumed that $u \in U$, $w \in W$, and $p \in P$.

For example, $f_{w2}$ can be calculated from the number of pieces of operation information with respect to the Web element w among pieces of operation information of the user u. In addition, for example, $f_{w3}$ can be calculated from the number of pieces of operation information with respect to the Web element w from which operation information with duplicating operation contents has been excluded among pieces of operation information of the user u. Furthermore, for example, $f_{w4}$ can be calculated from a time stamp of operation information with respect to the Web element w by the user u and a time stamp of operation information when the user u next performs an operation with respect to the Web element w. Moreover, for example, $f_{w5}$ can be calculated from the number of pieces of bug information of bugs associated with the Web element w among bug information of the user u.

Similarly, for example, $f_{p2}$ can be calculated from the number of pieces of operation information with respect to Web elements in the screen p among pieces of operation information of the user u. In addition, for example, $f_{p3}$ can be calculated from the number of pieces of operation information with respect to a Web element taking an input value of an input field, a select box, or the like in the screen p until a transition to a next screen is made among the operation information of the user u. Furthermore, for example, $f_{p4}$ can be calculated from the number of pieces of operation information with respect to a Web element taking an input value of an input field, a select box, or the like in the screen p until a transition to a next screen is made among the operation information of the user u from which operation information with operation contents including duplicating input values have been excluded. In addition, for example, $f_{p5}$ can be calculated from a time stamp of operation information with respect to a Web element for making a transition to a screen p and a time stamp of operation information with respect to a Web element for making a transition from the screen p to another screen among the operation information of the user u. Furthermore, for example, $f_{p6}$ can be calculated from the number of pieces of bug information of bugs associated with the screen p among the bug information of the user u.

In addition, for example, $f_{p7}$ can be calculated as the number of Web elements included in a screen p by analyzing HTML or the like describing the screen p. Furthermore, for example, $f_{p8}$ can be calculated as a total number of pieces of operation information with respect to a Web element for making a transition to the screen p.

<<Suspicion Level>>

A suspicion level is defined by using the respective index values $f_{w1}$ to $f_{w5}$ and $f_{p1}$ to $f_{p8}$ described above. Hereinafter, a suspicion level is denoted by d. The suspicion level d is formally defined by $d=r/s$ or $d=1-r/s$, where r, $s \in \{f_{w1}, f_{w2}, f_{w3}, f_{w4}, f_{w5}, f_{p1}, f_{p2}, f_{p3}, f_{p4}, f_{p5}, f_{p6}, f_{p7}, f_{p8}\}$.

However, the suspicion level d must substantially satisfy all of the following conditions.

Condition 1: r and s are selected so as to satisfy $0 \leq d \leq 1$.

Condition 2: An index value with respect to a Web element and an index value with respect to a screen are not used in combination. In other words, if either one of r and s is an index value with respect to a Web element, an index value with respect to a Web element is also used for the other index value. Similarly, if either one of r and s is an index value with respect to a screen, an index value with respect to a screen is also used for the other index value.

Condition 3: Since units of $f_{w4}$ and $f_{p5}$ are time, $f_{w4}$ and $f_{p5}$ are not used in combination with other index values. In other words, when Condition 2 is also taken into consideration, if either one of r and s is $f_{w4}$, $f_{w4}$ is also used for the other. Similarly, when either one of r and s is $f_{p5}$, $f_{p5}$ is also used for the other.

Condition 4: $f_{p7}$ (P) and $f_{p8}$ (P) are used as s, and when r is $f_{pN}$ (U', P') (where $N \in \{1, \ldots, 8\}$), $P' \subseteq P$ is satisfied.

Condition 5: When $s=f_{wM}$ (U, W) (where $M \in \{1, \ldots, 5\}$) and $r=f_{wL}$ (U', W') (where $L \in \{1, \ldots, 5\}$), any of (a) $U=U'$ and $W' \subseteq W$ and (b) $U' \subseteq U$ and $W'=W$ is satisfied.

Condition 6: When $s=f_{pM}$ (U, W) (where $M \in \{1, \ldots, 6\}$) and $r=f_{pL}$ (U', W') (where $L \in \{1, \ldots, 6\}$), any of (a) $U=U'$ and $W' \subseteq W$ and (b) $U' \subseteq U$ and $W'=W$ is satisfied.

Since the higher the suspicion level of a Web element or a screen, the higher the possibility that a bug is to be found, by highlighting and displaying such a Web element or a screen and proposing the Web element or the screen as a location to be tested next, a tester can use the proposed location as a reference when determining a location to be tested next in exploratory testing. It should be noted that the tester does not necessarily have to comply with a highlighted display based on a suspicion level.

For example, conceivably, bugs are readily detected at the following location (a web element or a screen).

A location where many bugs have been found before

A location having been tested only a small number of times in an entire test

A Web element of which the number of times that a unique input value has been tried is small Therefore, hereinafter, a specific example of a suspicion level will be described based on the assumption provided above.

(Location where Many Bugs have been Found Before)

Suspiciousness that an operation with respect to a Web element or a screen causes a bug will be defined as "a suspicion level due to a bug".

A suspicion level $d_{bw}$ due to a bug of a Web element w is calculated as follows, with all users being denoted as $U_{all}$.

$$d_{1w} = f_{w5}(U_{all}, \{w\})/f_{w1}(U_{all}, \{w\}) =$$

$$\text{(the number of bugs associated with } w)/\text{(the number of}$$

$$\text{times an operation has been performed with respect to } w)$$

In addition, a suspicion level $d_{ip}$ due to a bug of a screen p is calculated as follows.

$$d_{1p} =$$

$$f_{p6}(U_{all}, \{p\})/f_{p1}(U_{all}, \{p\}) = \text{(the number of bugs associated with } p)/$$

$$\text{(the number of times a transition has been made to } p)$$

In other words, a suspicion level due to a bug of a Web element or a screen increases when the Web element or a screen is conceivably associated with many bugs despite been checked only a small number of times in a test.

(Location Having been Tested Only a Small Number of Times in an Entire Test)

Suspiciousness due to the fact that the number of times a Web element or a screen is checked is small will be defined as "a suspicion level due to the number of times".

A suspicion level $d_{2w}$ due to the number of times of a Web element w is calculated as follows, with all Web elements being denoted as $W_{all}$.

$$d_{2w} =$$

$$1 - f_{w1}(U_{all}, \{w\})/f_{w1}(U_{all}, W_{all}) = 1 - \text{(the number of times an operation}$$

$$\text{has been performed with respect to } w)/\text{(the number of times an}$$

$$\text{operation has been performed with respect to all Web elements)}$$

A suspicion level $d_{2p}$ due to the number of times of a screen p is calculated as follows, with all screens being denoted as $P_{all}$.

$$d_{2p} = 1 - f_{p1}(U_{all}, \{p\})/f_{p1}(U_{all}, P_{all}) =$$

$$1 - \text{(the number of times a transition has been made to } p)/$$

$$\text{(the number of times a transition has been made to all screens)}$$

In other words, when the number of times a pertinent Web element or screen is checked is smaller than the number of times that all Web elements or screens are checked in an entire test, the suspicion level due to the number of times increases.

(Web Element of which the Number of Times that a Unique Input Value has been Tried is Small)

In this case, it is assumed that a Web element is an element which takes an input value such as an input form or a select box. Suspiciousness due to the number of times that a variation of an input value has been tried is small will be defined as "a suspicion level due to input".

A suspicion level $d_{3w}$ due to input of a Web element w is calculated as follows.

$$d_{3w} =$$

$$1 - f_{w2}(U_{all}, \{w\})/f_{w3}(U_{all}, \{w\}) = 1 - \text{(the number of times a unique}$$

$$\text{input has been performed with respect to } w)/\text{(the total number}$$

$$\text{of times an input has been performed with respect to } w)$$

In other words, when only a same input is performed with respect to a certain Web element in a test, a suspicion level due to input with respect to the Web element increases.

<Hardware Configuration of Test Support Apparatus 10>

Next, a hardware configuration of the test support apparatus 10 according to the present embodiment will be described with reference to FIG. 1. FIG. 1 is a diagram showing an example of a hardware configuration of the test support apparatus 10 according to the present embodiment.

As shown in FIG. 1, the test support apparatus 10 according to the present embodiment is realized by a hardware configuration of a general computer or a computer system and includes an input apparatus 101, a display apparatus 102, an external I/F 103, a communication I/F 104, a processor 105, and a memory apparatus 106. Each of these pieces of hardware is communicatively connected via a bus 107.

The input apparatus 101 is, for example, a keyboard, a mouse, a touch panel, or the like. The display apparatus 102 is, for example, a display or the like.

The external I/F 103 is an interface with an external apparatus such as a recording medium 103a. The test support apparatus 10 can read from and write to the recording medium 103a via the external I/F 103. Examples of the recording medium 103a include a CD (Compact Disc), a DVD (Digital Versatile Disk), an SD memory card (Secure Digital memory card), a USB (Universal Serial Bus) memory card, and the like.

The communication I/F 104 is an interface for connecting the test support apparatus 10 to a communication network. The processor 105 is, for example, various calculation apparatuses such as a CPU (Central Processing Unit) and a GPU (Graphics Processing Unit). The memory apparatus 106 is, for example, various storage apparatuses such as an HDD (Hard Disk Drive), an SSD (Solid State Drive), a RAM (Random Access Memory), a ROM (Read Only Memory), and a flash memory.

The test support apparatus 10 according to the present embodiment is capable of realizing test support processing to be described later due to having the hardware configuration shown in FIG. 1. Note that the hardware configuration shown in FIG. 1 is an example and the test support apparatus 10 may have another hardware configuration. For example, the test support apparatus 10 may have a plurality of processors 105 or a plurality of memory apparatuses 106.

<Functional Configuration of Test Support Apparatus 10>

Figure 2:
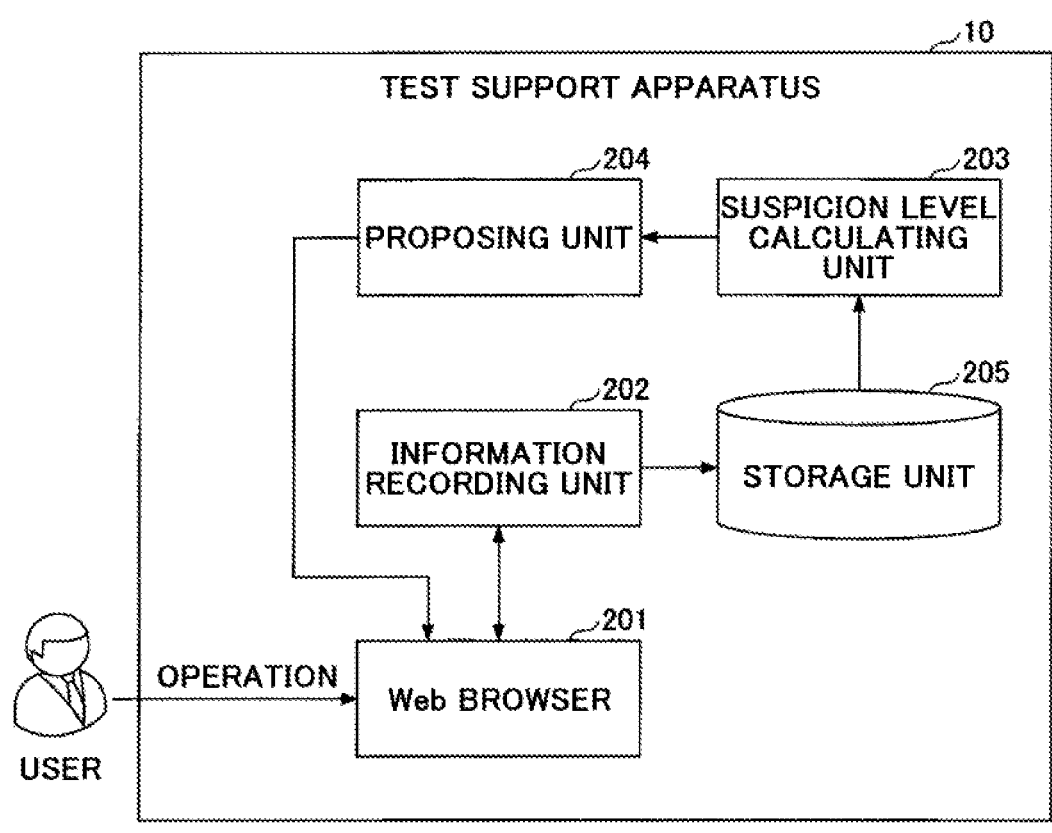
FIG. 2 is a diagram showing an example of a functional configuration of the test support apparatus according to the present embodiment.

Next, a functional configuration of the test support apparatus 10 according to the present embodiment will be described with reference to FIG. 2. FIG. 2 is a diagram showing an example of a functional configuration of the test support apparatus 10 according to the present embodiment.

As shown in FIG. 2, the test support apparatus 10 according to the present embodiment includes a Web browser 201, an information recording unit 202, a suspicion level calculating unit 203, and a proposing unit 204. Each of the units is implemented through, for example, processing which the processor 105 or the like is caused to execute by one or more programs installed in the test support apparatus 10.

In addition, the test support apparatus 10 according to the present embodiment includes a storage unit 205. The storage unit 205 is implemented by, for example, the memory apparatus 106. Note that the storage unit 205 may be realized by, for example, a storage apparatus or the like connected to the test support apparatus 10 via a communication network.

The Web browser 201 is a Web browser for displaying a screen of a Web application or accepting an operation with respect to the screen.

The information recording unit 202 collects operation information with respect to a screen displayed on the Web browser 201 and bug information of a test with respect to the screen, and stores (records) the operation information and the bug information in the storage unit 205. As described earlier, the operation information and the bug information can be recorded by any known method.

The suspicion level calculating unit 203 calculates at least one of an index value with respect to a Web element and an index value with respect to a screen by using at least one of operation information and bug information stored in the storage unit 205, and then calculates a suspicion level from the index values.

The proposing unit 204 highlights and displays a Web element having a high suspicion level and a screen having a high suspicion level using the suspicion level calculated by the suspicion level calculating unit 203, and proposes a location to be tested next to a user.

The storage unit 205 stores the operation information and the bug information collected by the information recording unit 202.

<Test Support Processing>

Figure 3:
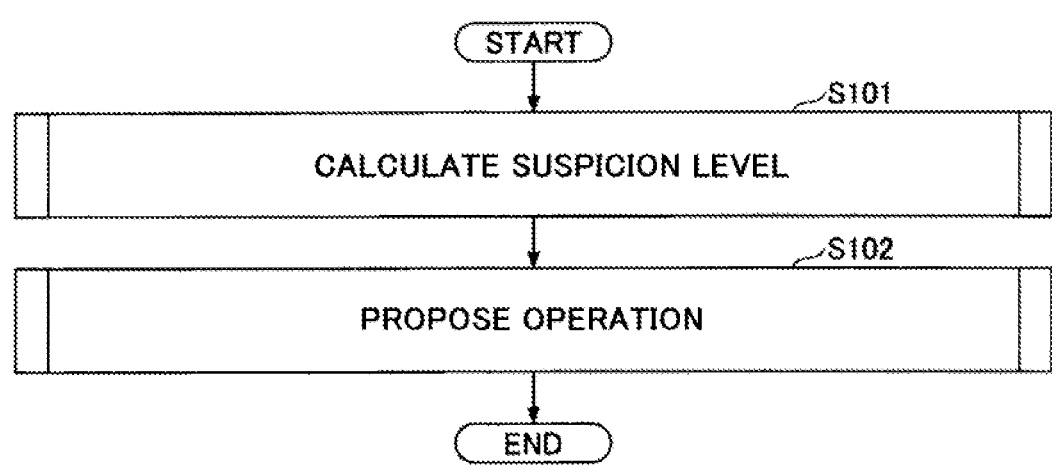
FIG. 3 is a flowchart showing an example of test support processing according to the present embodiment.

Next, test support processing executed by the test support apparatus 10 according to the present embodiment will be described with reference to FIG. 3. FIG. 3 is a flow chart showing an example of the test support processing according to the present embodiment. In the following description, it is assumed that operation information and bug information are stored (recorded) in the storage unit 205 by the information recording unit 202.

The suspicion level calculating unit 203 calculates at least one of an index value with respect to a Web element and an index value with respect to a screen by using at least one of the operation information and the bug information stored in the storage unit 205, and then calculates a suspicion level from the index values (step S101). Details of the processing (suspicion level calculation processing) for calculating the suspicion level will be described later.

The proposing unit 204 highlights and displays a Web element having a high suspicion level and a screen having a high suspicion level using the suspicion level calculated in step S101 described above, and proposes a location to be tested next to a user (step S102). Details of the processing (test location proposal processing) for performing the proposal will be described later.

Figure 4:
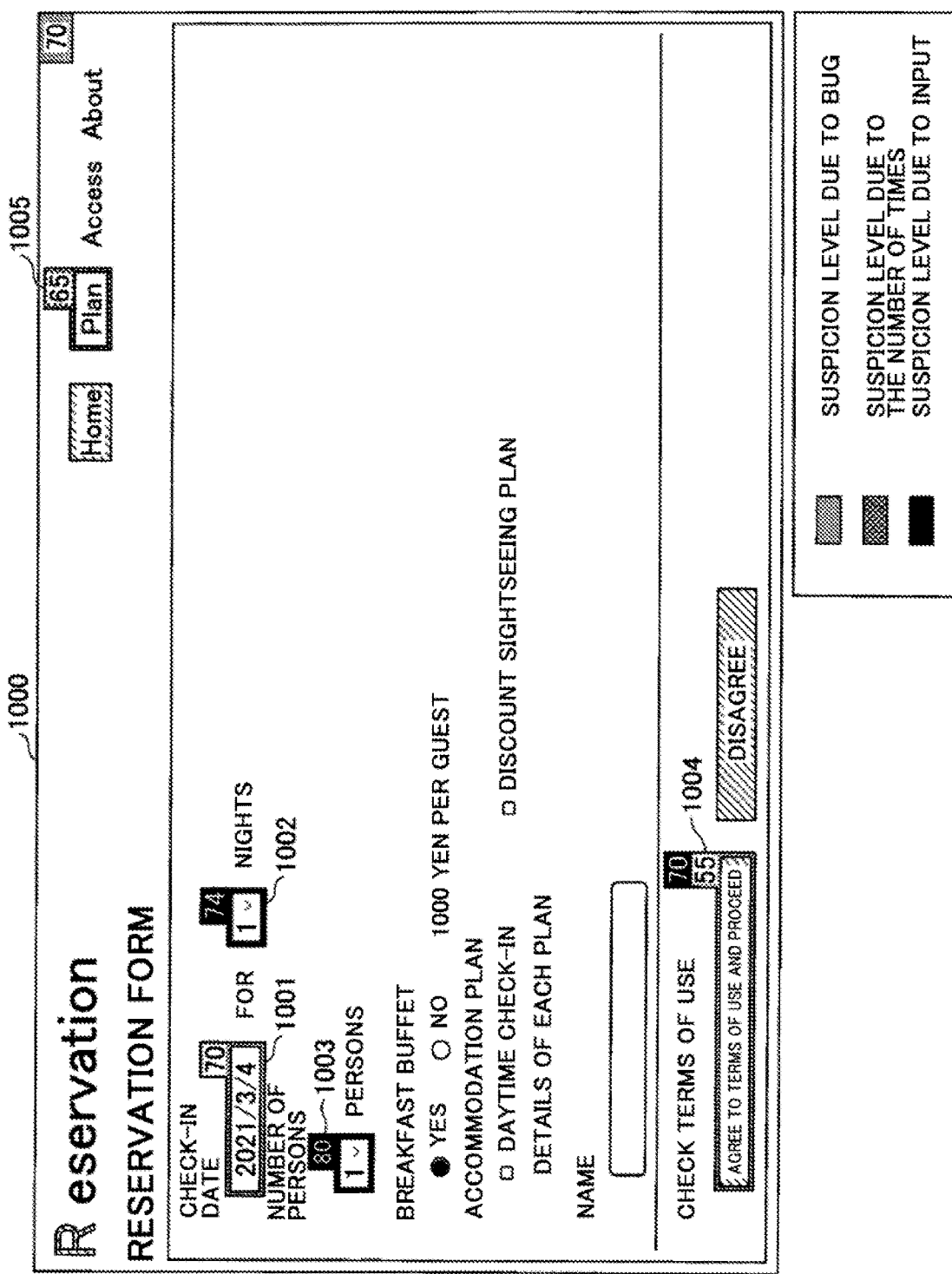
FIG. 4 is a diagram showing an example of a proposal result of a test location.

Next, an example of a result of the proposal made in step S102 described above will be described with reference to FIG. 4. FIG. 4 is a diagram showing an example of a result of a proposal of a test location.

Hereinafter, it is assumed that, in step S101, a suspicion level due to a bug of each screen, a suspicion level due to a bug of each Web element, a suspicion level due to the number of times of each screen, a suspicion level due to the number of times of each Web element, and a suspicion level due to input of each Web element have been calculated. In addition, it is assumed that, with respect to screens, screens of which a suspicion level is ranked in the top $T_P$ positions are highlighted and displayed, and with respect to Web elements, Web elements of which a suspicion level is ranked in the top $T_W$ positions are highlighted and displayed. Furthermore, as the highlighted displays, with respect to a screen, a value equal to suspicion level×100 is displayed at top right of the screen, and with respect to a Web element, the Web element is enclosed by a bold line and a value equal to suspicion level×100 is displayed at top right. However, modes of the highlighted display is not limited to this mode and, for example, a mode involving blinking or pointing by an arrow may be adopted. Note that $T_P$ and $T_W$ are integers determined in advance of 1 or more.

In the example shown in FIG. 4, a suspicion level due to a bug of a screen 1000 is ranked in the top $T_P$ positions and a value "70" is displayed at top right of the screen 1000.

In addition, in the example shown in FIG. 4, a suspicion level due to a bug of a Web element 1001 is ranked in the top $T_W$ positions and a value "70" is displayed at top right of the Web element 1001. Similarly, a suspicion level due to input of a Web element 1002 is ranked in the top $T_W$ positions and a value "74" is displayed at top right of the Web element 1002. Similarly, a suspicion level due to input of a Web element 1003 is ranked in the top $T_W$ positions and a value "80" is displayed at top right of the Web element 1003. Similarly, a suspicion level due to a bug and a suspicion level due to the number of times of a Web element 1004 are both ranked in the top $T_W$ positions, and a value "55" obtained by multiplying the suspicion level due to a bug by 100 and a value "70" obtained by multiplying the suspicion level due to the number of times by 100 are displayed at top right of the Web element 1004. Similarly, a suspicion level due to the number of times of a Web element 1005 is ranked in the top $T_W$ positions and a value "65" is displayed at top right of the Web element 1005.

By referring to highlighted displays such as those shown in FIG. 4, a tester can determine a location (a screen or a Web element) to be tested next and contents of the test.

<<Suspicion Level Calculation Processing>>

Figure 5:
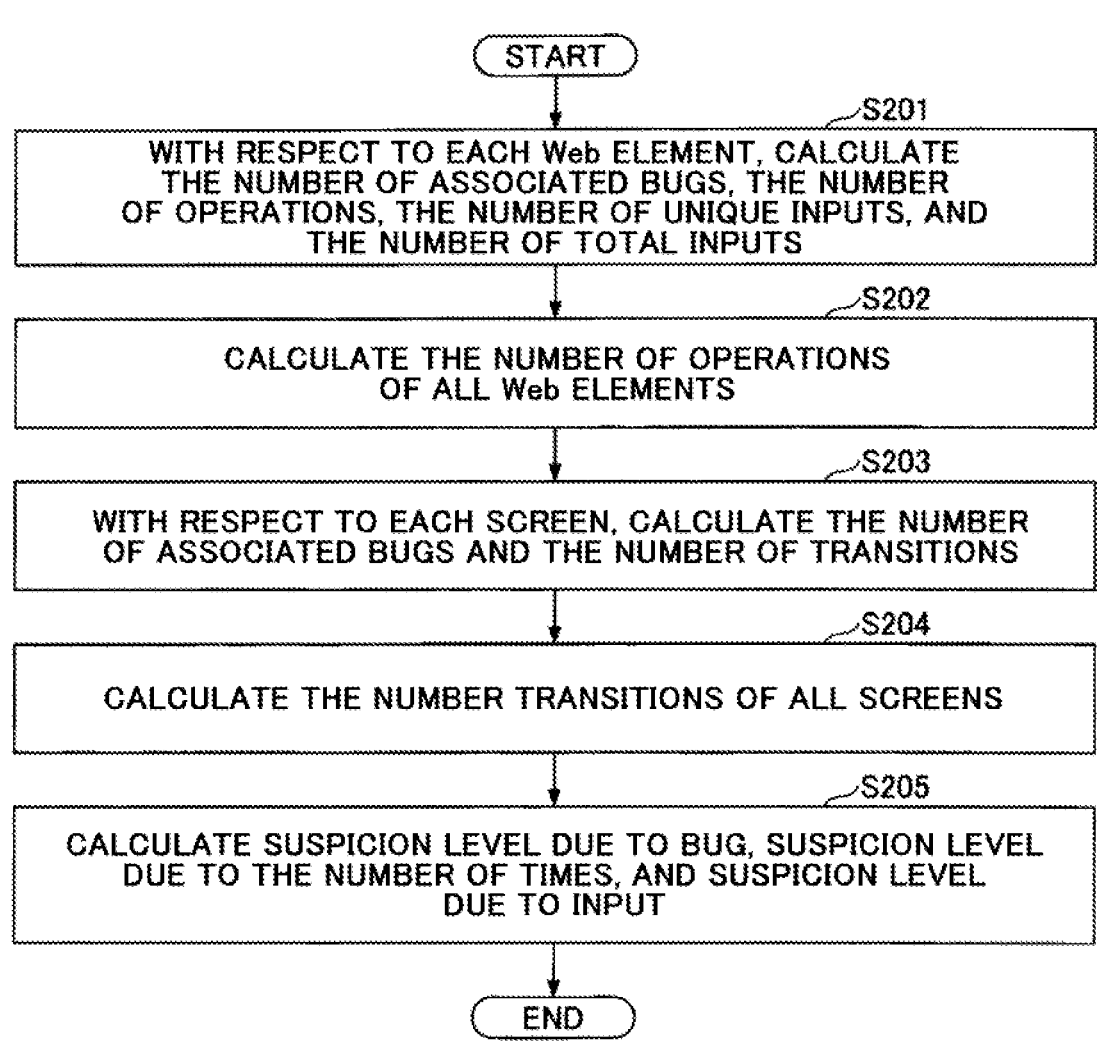
FIG. 5 is a flowchart showing an example of suspicion level calculation processing according to the present embodiment.

Next, suspicion level calculation processing of step S101 described above will be described with reference to FIG. 5. FIG. 5 is a flowchart showing an example of suspicion level calculation processing according to the present embodiment. Hereinafter, as an example, a case of calculating a suspicion level due to a bug of each screen, a suspicion level due to a bug of each Web element, a suspicion level due to the number of times of each screen, a suspicion level due to the number of times of each Web element, and a suspicion level due to input of each Web element will be described.

The suspicion level calculating unit 203 calculates, with respect to each Web element $w \in W_{all}$, the number of bugs of an association number to the Web element w, the number of times an operation has been performed with respect to the Web element w, the number of times an input has been performed with respect to the Web element w, and the number of times a unique input has been performed with respect to the Web element w (step S201).

Next, the suspicion level calculating unit 203 calculates the number of times an operation has been performed with respect to all Web elements (step S202). This is the sum of the numbers of times an operation has been performed with respect to the respective Web elements w.

Next, the suspicion level calculating unit 203 calculates, with respect to each screen $p \in P_{all}$, the number of bugs associated with the screen p and the number of times a transition has been made to the screen p (step S203).

Next, the suspicion level calculating unit 203 calculates the number of times a transition has been made to all screens (step S204). This is the sum of the numbers of times a transition has been made to the respective screens p.

Next, using the calculation results of steps S201 to S204 described above, the suspicion level calculating unit 203 calculates, with respect to each screen p and each Web element w, a suspicion level $d_{1p}$ due to a bug of the screen p, a suspicion level $d_{1w}$ due to a bug of the Web element w, a suspicion level $d_{2p}$ due to the number of times of the screen p, a suspicion level $d_{2w}$ due to the number of times of the Web element w, and a suspicion level $d_{3w}$ due to input of the Web element w (step S205).

<<Test Location Proposal Processing>>

Figure 6:
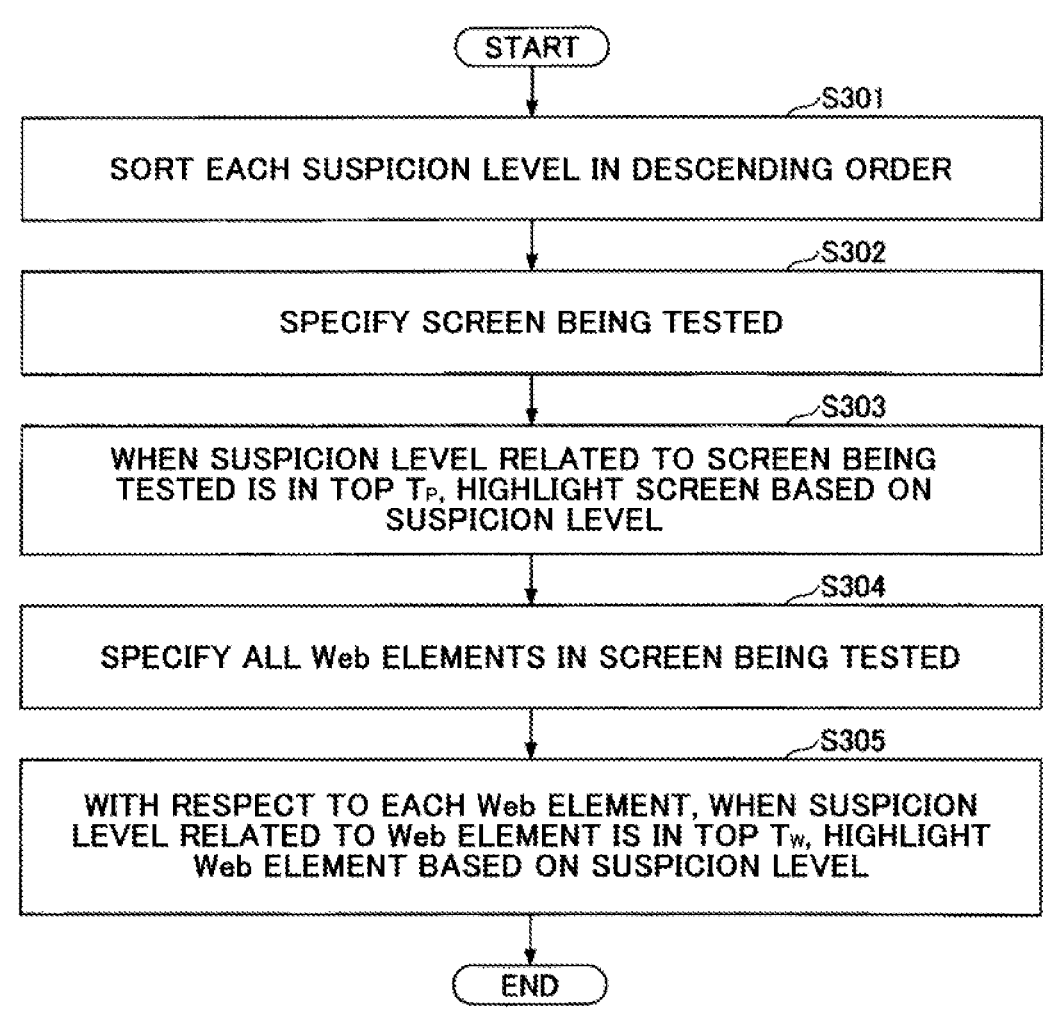
FIG. 6 is a flowchart showing an example of test location proposal processing according to the present embodiment.

Next, the test location proposal processing in step S102 described above will be described with reference to FIG. 6. FIG. 6 is a flowchart showing an example of the test location proposal processing according to the present embodiment. Hereinafter, as an example, a case where a suspicion level $d_{1p}$ due to a bug of each screen p, a suspicion level $d_{1w}$ due to a bug of each Web element w, a suspicion level $d_{2p}$ due to the number of times of each screen p, a suspicion level $d_{2w}$ due to the number of times of each Web element w, and a suspicion level $d_{3w}$ due to input of each Web element w have been calculated will be described.

The proposing unit 204 respectively sorts, in a descending order, the suspicion level $d_{1p}$ due to a bug of each screen p, the suspicion level $d_{1w}$ due to a bug of each Web element w, the suspicion level $d_{2p}$ due to the number of times of each screen p, the suspicion level $d_{2w}$ due to the number of times of each Web element w, and the suspicion level $d_{3w}$ due to input of each Web element w (step S301).

Next, the proposing unit 204 specifies a screen being tested (step S302). Hereinafter, the screen being tested will be denoted by p'.

Next, when the suspicion level of the screen p' is ranked in the top $T_P$ positions, the proposing unit 204 highlights and displays the screen p' based on the suspicion level thereof (step S303).

In other words, when a suspicion level $d_{1p'}$ due to a bug of the screen p' is ranked in the top $T_P$ positions, the proposing unit 204 displays a value of $d_{1p'} \times 100$ at top right to highlight the screen p'. In addition, when a suspicion level $d_{2p'}$ due to the number of times of the screen p' is ranked in the top $T_P$ positions, the proposing unit 204 displays a value of $d_{2p'} \times 100$ at top right to highlight the screen p'.

Next, the proposing unit 204 specifies all Web elements in the screen p' (step S304). Hereinafter, the Web elements will be denoted by w'∈W' (where W' is a set of all Web elements on the screen p').

Next, when a suspicion level of the Web element w' is ranked in the top $T_W$ positions, the proposing unit 204 highlights and displays the Web element w' based on the suspicion level thereof (step S305).

In other words, when a suspicion level $d_{1w'}$ due to a bug of the Web element w' is ranked in the top $T_W$ positions, the proposing unit 204 displays a value of $d_{1w'} \times 100$ at top right of the Web element w' and highlights the Web element w' by enclosing the Web element w' with a bold line. In addition, when a suspicion level $d_{2w'}$ due to the number of times of the Web element w' is ranked in the top $T_W$ positions, the proposing unit 204 displays a value of $d_{2w'} \times 100$ at top right of the Web element w' and highlights the Web element w' by enclosing the Web element w' with a bold line. Furthermore, when a suspicion level $d_{3w'}$ due to input of the Web element w' is ranked in the top $T_W$ positions, the proposing unit 204 displays a value of $d_{3w'} \times 100$ at top right of the Web element w' and highlights the Web element w' by enclosing the Web element w' with a bold line.

CONCLUSION

As described above, the test support apparatus 10 according to the present embodiment calculates, using operation information and/or bug information during a test, a value called a suspicion level representing a suspiciousness that a bug is caused by an operation with respect to a Web element or a screen. In addition, the test support apparatus 10 according to the present embodiment proposes a Web element or a screen of which the suspicion level is high to a tester as a location to be tested next. Accordingly, bugs can be efficiently detected even in a case of highly individual-dependent exploratory testing or even when a skilled tester is not available.

The present invention is not limited to the embodiment specifically disclosed above and various modifications, changes, combinations with known techniques, and the like can be made without departing from the scope of the claims.

REFERENCE SIGNS LIST

10 Test support apparatus
101 Input apparatus

102 Display apparatus
103 External I/F
103a Recording medium
104 Communication I/F
105 Processor
106 Memory apparatus
107 Bus
201 Web browser
202 Information recording unit
203 Suspicion level calculating unit
204 Proposing unit
205 Storage unit

The invention claimed is:

1. A test support apparatus for supporting a test with respect to a Web application, the test support apparatus comprising:

a processor; and a memory storing program instructions that cause the processor to:

calculate, using information related to an operation performed on a screen of the Web application and information related to a bug of the Web application, a suspicion level representing a suspiciousness that the bug is caused by the operation on the screen, the suspicion level including a first suspicion level representing a suspiciousness that the bug is caused by an operation with respect to the screen and a second suspicion level representing a suspiciousness that the bug is caused by an operation with respect to a component of the screen;

calculate the first suspicion level according to a combination of any two of a number of times a transition has been made by a user to the screen from another screen, a number of times an operation has been performed by the user on the screen, a number of input values input by an input operation of the user on the screen, a number of unique input values among the input values input by an input operation of the user on the screen, a dwell time of the user on the screen, a number of bugs detected by the user on the screen, a number of components of the screen, and a total number of times a transition has been made to the screen from another screen;

calculate the second suspicion level according to a combination of two of a number of times an operation has been performed by the user with respect to the component, a number of times an input operation has been performed by the user with respect to the component, a number of times a unique input operation has been performed among the input operations performed by the user with respect to the component, a time after an operation has been performed by the user with respect to the component until a next operation is performed, and a number of bugs associated with the component among bugs detected by the user;

in response to calculating the first suspicion level and the second suspicion level, sort the first suspicion level in a descending order, and sort the second suspicion level in a descending order, and in a case in which the screen being tested is within a first predetermined rank, display a value indicating the first suspicion level on the screen being tested, and in a case in which the component of the screen being tested is within a second predetermined rank, display a value indicating the second suspicion level adjacent to the component, to notify the user;

propose a screen of which the first suspicion level is ranked in a predetermined number of top positions as a location to be tested by adding a value based on the first suspicion level and highlighting and displaying the screen; and propose a component of which the second suspicion level is ranked in a predetermined number of top positions as the location to be tested by adding a value based on the second suspicion level and highlighting and displaying the component.

2. A test support apparatus for supporting a test with respect to a Web application, the test support apparatus comprising:

a processor; and a memory storing program instructions that cause the processor to:

calculate, using information related to an operation performed on a screen of the Web application and information related to a bug of the Web application, a first suspicion level representing a suspiciousness that the bug is caused by an operation with respect to the screen and a second suspicion level representing a suspiciousness that the bug is caused by an operation with respect to a component of the screen, the first suspicion level including at least one of a suspicion level represented by a ratio between a number of bugs detected by each user on the screen and a number of times a transition has been made by each user to the screen from another screen, and a suspicion level represented by a value obtained by subtracting, from 1, a ratio between the number of times a transition has been made by each user to the screen from another screen and a sum of the number of times a transition has been made from each screen to another screen of the Web application by each user, and the second suspicion level including at least one of a suspicion level represented by a ratio between a number of bugs associated with the component among bugs detected by each user and a number of times an operation has been performed with respect to the component by each user, a suspicion level represented by a value obtained by subtracting, from 1, a ratio between the number of times an operation has been performed with respect to the component by each user and a sum of the number of times an operation has been performed with respect to each component of each screen of the Web application by each user, and a suspicion level represented by a value obtained by subtracting, from 1, a ratio between a number of times a unique input operation has been performed with respect to the component by each user and a total number of times an input operation has been performed with respect to the component by each user;

in response to calculating the first suspicion level and the second suspicion level, sort the first suspicion level in a descending order, and sort the second suspicion level in a descending order, and in a case in which the screen being tested is within a first predetermined rank, display a value indicating the first suspicion level on the screen being tested, and in a case in which the component of the screen being tested is within a second predetermined rank, display a value indicating the second suspicion level adjacent to the component, to notify the user;

propose a screen of which the first suspicion level is ranked in a predetermined number of top positions as a location to be tested by adding a value based on the first suspicion level and highlighting and displaying the screen; and propose a component of which the second suspicion level is ranked in a predetermined number of top positions as the location to be tested by adding a value based on the second suspicion level and highlighting and displaying the component.

3. A test support method performed by a computer that supports a test with respect to a Web application, the test support method comprising:

calculating, using information related to an operation performed on a screen of the Web application and information related to a bug of the Web application, a suspicion level representing a suspiciousness that the bug is caused by the operation on the screen, the suspicion level including a first suspicion level representing a suspiciousness that the bug is caused by an operation with respect to the screen and a second suspicion level representing a suspiciousness that the bug is caused by an operation with respect to a component of the screen;

calculating the first suspicion level according to a combination of any two of a number of times a transition has been made by a user to the screen from another screen, a number of times an operation has been performed by the user on the screen, a number of input values input by an input operation of the user on the screen, a number of unique input values among the input values input by an input operation of the user on the screen, a dwell time of the user on the screen, a number of bugs detected by the user on the screen, a number of components of the screen, and a total number of times a transition has been made to the screen from another screen;

calculating the second suspicion level according to a combination of two of a number of times an operation has been performed by the user with respect to the component, a number of times an input operation has been performed by the user with respect to the component, a number of times a unique input operation has been performed among the input operations performed by the user with respect to the component, a time after an operation has been performed by the user with respect to the component until a next operation is performed, and a number of bugs associated with the component among bugs detected by the user;

in response to calculating the first suspicion level and the second suspicion level, sorting the first suspicion level in a descending order, and sorting the second suspicion level in a descending order, and in a case in which the screen being tested is within a first predetermined rank, displaying a value indicating the first suspicion level on the screen being tested, and in a case in which the component of the screen being tested is within a second predetermined rank, displaying a value indicating the second suspicion level adjacent to the component, to notify the user;

proposing a screen of which the first suspicion level is ranked in a predetermined number of top positions as a location to be tested by adding a value based on the first suspicion level and highlighting and displaying the screen; and proposing a component of which the second suspicion level is ranked in a predetermined number of top positions as the location to be tested by adding a value based on the second suspicion level and highlighting and displaying the component.

4. A non-transitory computer-readable recording medium storing a program in a memory for causing a processor to perform the test support method of claim 3.

\* \* \* \* \*